United States Patent [19]

Sloan et al.

[11] Patent Number: 4,605,051
[45] Date of Patent: Aug. 12, 1986

[54] APPARATUS FOR TRIMMING TIRES

[75] Inventors: Gary W. Sloan; Walter H. Nelson, both of Lawton, Okla.

[73] Assignee: The Goodyear Tire & Rubber Company, Akron, Ohio

[21] Appl. No.: 643,114

[22] Filed: Aug. 22, 1984

[51] Int. Cl.⁴ .......................................... B29H 21/08
[52] U.S. Cl. ..................................................... 157/13
[58] Field of Search .......................................... 157/13

[56] References Cited

U.S. PATENT DOCUMENTS 2,524,489 10/1950 Strong ..................................... 157/13
3,262,483 7/1966 Warnecke et al. ...................... 157/13

Primary Examiner—James G. Smith
Attorney, Agent, or Firm—L. R. Drayer; M. W. Goodwin

[57] ABSTRACT

Apparatus for trimming vents from the tread of tires including at least one trimmer (42). Each trimmer includes a pair of tire engageable rollers (84, 86) and a cooperating knife (88). The apparatus may include a plurality of sets of trimmers (42, 42A, 42B), a bead trimmer (42) may be mounted for limited rocking movement about an axis extending parallel to the axis of the rollers, and one set may include a pair of bead trimmers (88A, 88B) the rollers (84A, 86A, 84B, 86B) of which are inclined or inclinable to the axis about which the trimmer rocks.

12 Claims, 9 Drawing Figures

APPARATUS FOR TRIMMING TIRES

The foregoing abstract is not to be taken as limiting the invention of this application, and in order to understand the full nature and extent of the technical disclosure of the application, reference must be made to the accompanying drawings and the following detailed description.

This invention relates to apparatus for removing vents from tires.

In the present processes for curing tires and particularly pneumatic tires it is commonplace to place the tire in a mold which impresses upon the exterior of the tire desired design features as well as the desired pattern for the tread. For reasons known to the industry it is commonplace to provide such molds with very small openings into which minute amounts of rubber flow during the curing process. When the tire is withdrawn from the mold said small amounts of rubber remain with the tire forming many projections or whiskers sometimes referred to as vents or pips. Because it is felt that such vents or pips detract from the appearance of the tire it is the usual procedure to remove them prior to sale of the tire.

It is the object of the present invention to provide a novel and improved vent trimmer and vent trimming apparatus for the removal of vents from the tread area of a tire.

Figure 1:
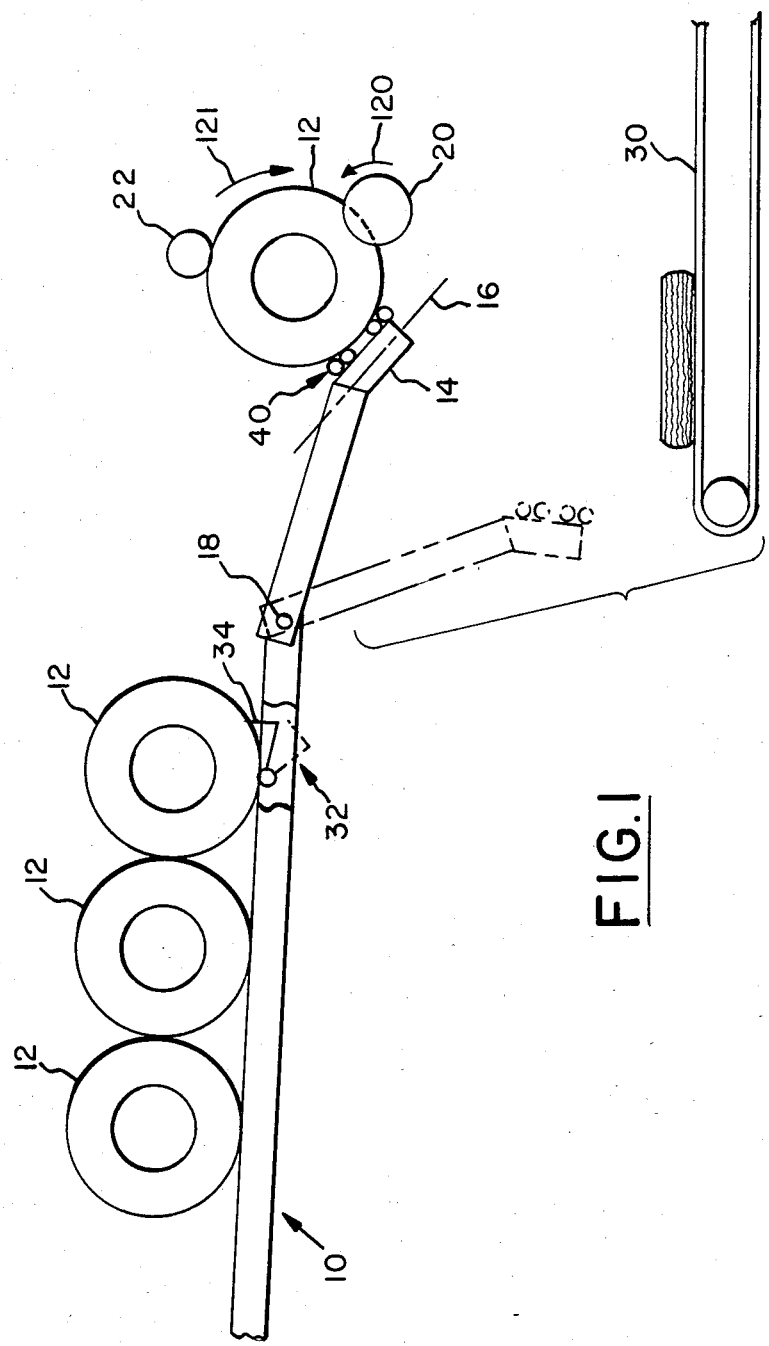
FIG. 1 is a side elevational view of apparatus for trimming tires incorporating vent trimmers of this invention.

With reference to the drawings and particularly FIG. 1, a vent trimmer of this invention is shown in association with apparatus for trimming tires comprising a conveyor 10. The conveyor is of conventional construction and is operative to convey tires along a predetermined path or direction with the tires 12 being disposed in a vertical or upright position with the axes of rotation of the tires extending at right angles to their path of travel along the conveyor. The conveyor includes a terminal end portion 14 having a general plane indicated at 16. The end portion 14 of the conveyor is mounted for pivotal movement about an axis 18 extending at right angles to the path of travel of the tires and between a tire supporting first position shown in solid line in FIG. 1 and a second position shown in broken line in FIG. 1. Also included within the apparatus illustrated in FIG. 1 is a drive roller 20 which is engageable with a tire to provide a surface drive of the tire to rotate the same about its vertical axis. The roller 20 preferably moving along the conveyor 10 and prevent further movement of the tire toward the end portion 14 of the conveyor. The gate member 34 is moved from its obstructing solid line position as shown in FIG. 1 to a nonobstructing broken line position shown in FIG. 1 in response to a predetermined event at the vent trimming station formed in part by the drive roller 20, thus permitting a tire to be moved by gravity or otherwise into engagement with the drive roller 20. This portion of the operation of the system will be better understood from a further reading of this description.

Figure 2:
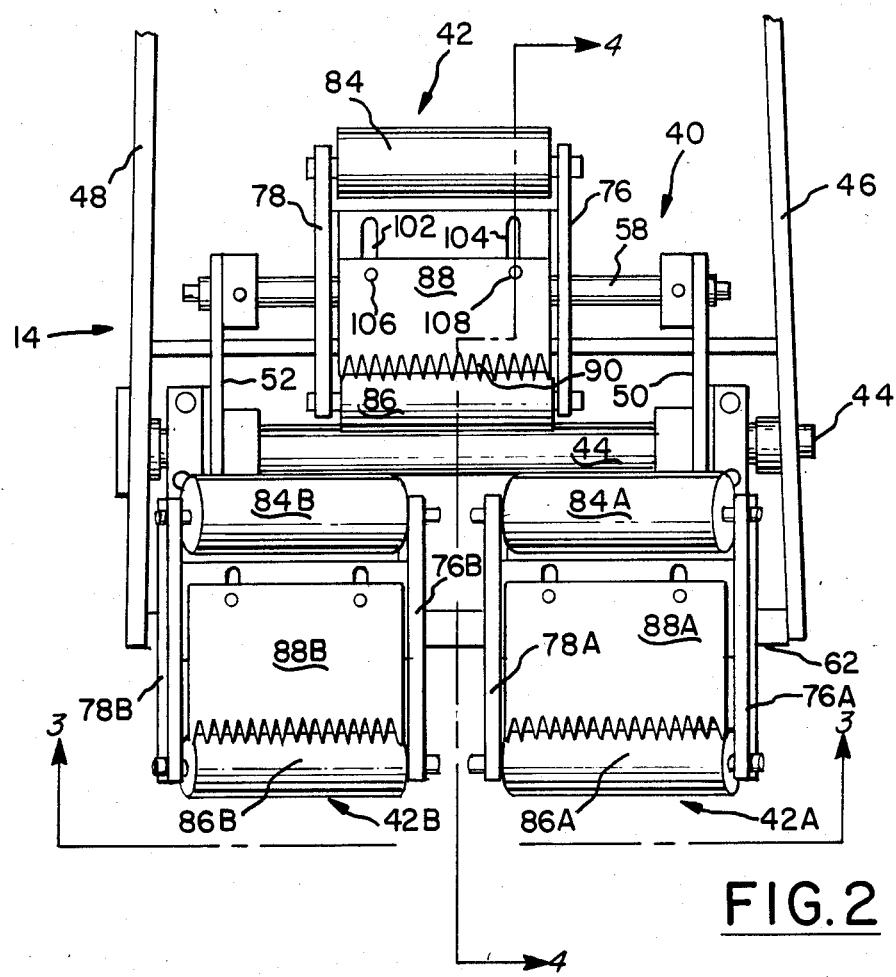
FIG. 2 is a fragmentary plan view illustrating the three vent trimmers of the present invention in the apparatus of FIG. 1.
Figure 3:
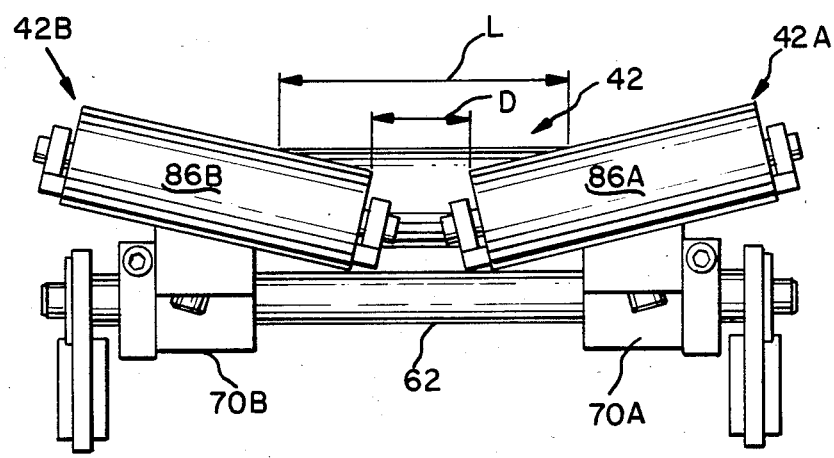
FIG. 3 is an enlarged end view of the assembly of FIG. 2 substantially along the line 3—3 of FIG. 2.
Figure 4A:
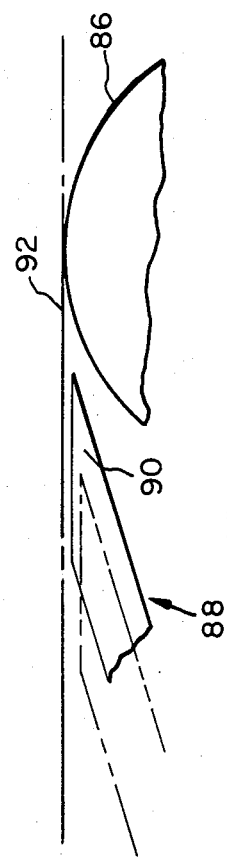
FIG. 4A is an enlarged fragmentary cross-sectional view of a portion of one vent trimmer.
Figure 4:
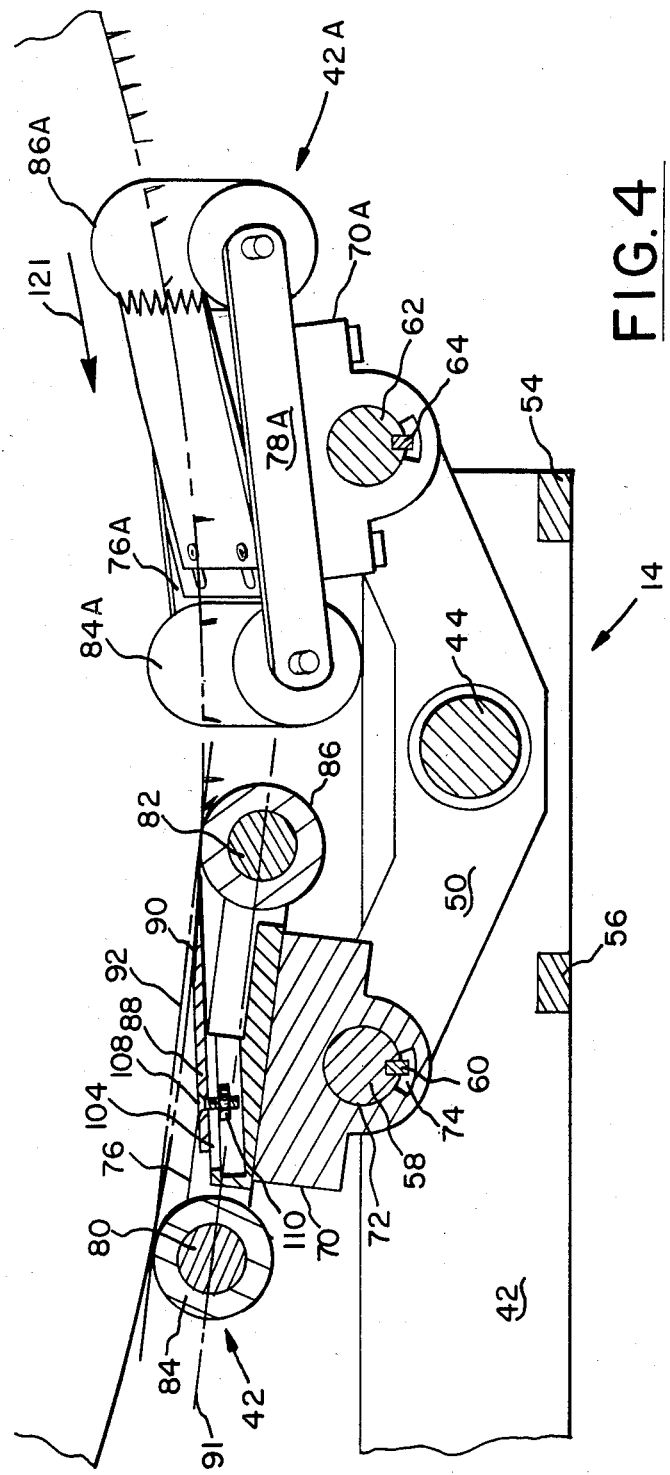
FIG. 4 is an enlarged cross-sectional view of the assembly of FIG. 2 substantially along the line 4—4 of FIG. 2.

Mounted on the terminal end portion 14 of the conveyor is a vent trimming assembly generally indicated at 40 and better shown in FIGS. 2 through 4. As shown in FIG. 2 the vent trimmer assembly 40 comprises a plurality of vent trimmers 42, 42A and 42B which in the specific embodiment are three in number. The vent trimmer assembly 40 includes a shaft 44 which is suitably journaled on side frame members 46,48 of the terminal end portion 14 of the conveyor. Fixed on the shaft 44 between the conveyor frame members 46,48 are a pair of frame members 50,52. The frame members 50,52 are arranged in parallel spaced apart relation adjacent the ends, respectively, of the shaft 44. The shaft 44 is mounted for limited rocking movement about its axis. As best shown in FIG. 4 the frame member 50, in one limit position of rocking movement of the shaft 44, is engageable with a frame member 54 on the end portion 14 of the conveyor while in its opposite limit of rocking movement is engageable with a frame member 56 of the end portion 14 of a conveyor. Preferably, the range of rocking movement provided for the shaft 44 and frame members 50,52 is approximately 30 degrees, or more specifically 15 degrees either side of the portion of the frame angularly centered with respect to the frame members 54,56.

As best shown in FIGS. 2 and 4, mounted at one end of the frame members 50,52 is a shaft 58 which is fixed relative to the frame members 50,52 by a key or keys 60. A second shaft 62 is carried by the other ends of the frame members 50,52 and is keyed or fixed to the frame members by a key or keys 64. The shafts 58 and 62 extend in parallel spaced relation to each other and the shaft 44 and like the shaft 44 extend at right angles to the path of tire movement along the conveyor. Mounted on the shafts 58 and 62 for limited rocking movement about the axis of the shafts 58 and 62 are a plurality of vent trimmers. In the specific embodiment shown the vent trimmer 42 is mounted on the shaft 58 and the vent trimmers 42A and 42B are mounted on the shaft 62.

With specific reference to FIG. 4 the vent trimmer 42 comprises a body 70 having a bore or opening 72 pivotally receiving the shaft 58. The bore or opening 72 has an extension 74 in the form of an arcuate recess within which is received the key 60. The opposite ends of the recess 74 serve to limit the rocking movement of the body 70 upon the shaft 72. In the preferred embodiment shown, this rocking movement is approximately 30 degress, or more specifically, 15 degrees either side of the position in which the recess 74 is centered on the key 60. Mounted on the body 70 are a pair of side members 76,78 extending at right angles to the shaft 58 and thus the axis of pivotal movement of the body 70. Mounted at the opposite ends respectively of the side members 76,78 are a pair of shafts 80,82 which extend parallel to the shaft 58 and in spaced relation thereto.

Carried by the shafts 80 and 82 are a pair of freely rotatable rollers 84,86. The recess 74 in the body 70 is constructed and arranged such that when the key 60 is centered in the recess 74 the rollers 84,86 will lie in a common plane parallel to the general plane 16 of the end portion 14 of the conveyor and thus parallel to the path of movement of a tire along this portion of the conveyor.

The vent trimmer 42 further includes a knife 88 mounted on the body 70. The knife has a cutting edge portion 90 which extends parallel to the rotational axis of the rollers 84,86 and is located closely adjacent the roller 86. The cutting edge portion 90 has a saw-tooth configuration whereby vents on a tire may be received in the valleys between the teeth of the portion 90 so as to be severed from the tire as the tire is rotated relative to the knife.

As most clearly shown in FIG. 4, the knife 88 is releasably mounted generally between the rollers 84,86 to a selected one of a plurality of positions along a path extending angularly of the rotational axis of the rollers 84,86. As best illustrated in FIGS. 4A and 4, the cutting edge portion 90 lies between the common plane 91 containing the rotational axis of the rollers and a second plane 92 which extends parallel to the common plane 91 and is tangent to the surfaces of the rollers 84,86 on the side of the roller axes opposite the shaft 58. The knife 88 is mounted for adjustment toward and away from the roller 86 between a first limit position wherein the outer end of the cutting edge portion of the knife is located closely adjacent but spaced a predetermined distance from the plane 92, as shown in the solid line position of the knife in FIG. 4A and a second limit position shown in broken lines in FIG. 4A. In said second limit position, the outer end of the cutting edge portion of the knife is spaced from the first limit position in a direction toward the roller 84 and is spaced from the plane 92 a greater distance than said predetermined distance. More specifically the knife is mounted on a surface of the block 70 which is inclined relative to the plane 91 passing through and containing the rotational axis of the rollers 84,86. As can be seen from FIG. 4 the general plane of this surface is parallel to the roller axis. The body 70 is provided with a pair of slots 102,104 respectively receiving a pair of screws 106,108 extending through the knife 88 and engageable with nuts 110 within the body 70 whereby the knife may be secured in any desired position longitudinally of the slots 102,104.

The two vent trimmers 42A and 42B mounted on the shaft 62 are identical in construction to the trimmer just described with certain exceptions. Accordingly the elements of the vent trimmers 42A and 42B have been given the same reference numerals as the trimmer 42 but with the suffix A being applied to the reference numerals for the trimmer 42A and the suffix B for the trimmer 42B.

Figure 3A:
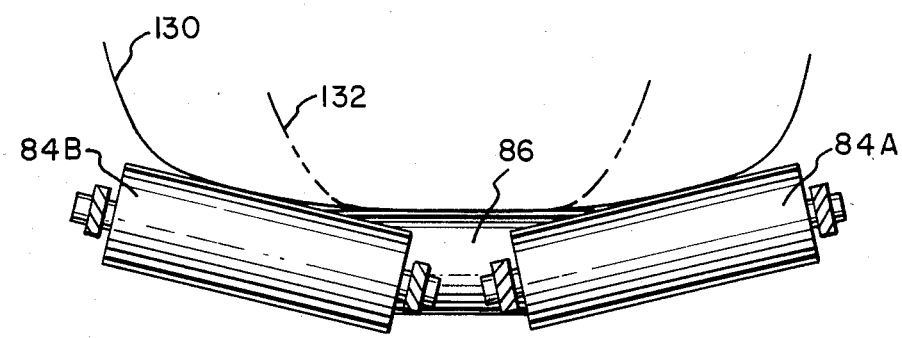
FIG. 3A is a fragmentary cross-sectional view similar to FIG. 3.

The difference between the vent trimmers 42A and 42B mounts on the shaft 62 and the trimmer 42 mounted on the shaft 58 is that, as shown in FIGS. 3 and 4, the bodies 70A,70B of the vent trimmers 42A,42B and the side plates 76A,78A and 76B,78B are so constructed and arranged that the axis of the rollers 84A,86A are inclined at a predetermined angle to the axis of the shaft 62 so as to extend toward the other vent trimmer 42B on the shaft 62 and toward the common plane containing the axis of the shafts 58 and 62. The two vent trimmers 42A and 42B being mounted on the same shaft 62 have a common axis about which their limited rocking movement is provided. The rollers of the trimmers 42A and 42B are each parallel to each other and the rollers of the trimmer 42. The trimmers 42A and 42B are located on the shaft 62 in a predetermined position relative to the location of the trimmer 42 which is centered on the shaft 58 between the side members 46,48. As best shown in FIGS. 2 and 3 the trimmers 42A and 42B are spaced apart on the shaft 62 so that their rollers are spaced a distance less than the length L of the rollers of the trimmer 42. It should be mentioned that in FIG. 3 the trimmers 42, 42A and 42B are angularly positioned about the shafts 58,62 so that all of the rollers lie in a general plane parallel to the plane common to the axes of the shafts 58,62. Thus, as seen in FIG. 3A when a tire is supported on the rollers of the vent trimmers 42,42A and 42B the interaction between the knives carried by the vent trimmers and the tire tread will be such that substantially the entire road engageable surface of the tire tread will come into operative relation with the knives so as to trim all the vents extending from the ground engageable surface of the tread. The spacing of the vent trimmers 42A and 42B and the angle of inclination of the rollers of the trimmers 42A and 42B are selected to provide this complete coverage of the tire tread ranging from the widest tire as shown in solid line at 130 in FIG. 3A to the narrowest tire as shown in dotted line at 132 in FIG. 3A. The mounting of the bodies of the vent trimmers for limited rocking movement about the shafts 58 and 62 permit the trimmers assemblies to adjust to the range tire tread widths.

In a specific example of apparatus incorporating vent trimmers of this invention for a range of tire diameters from approximately 22.6 inches (57.4 cm) to 28.2 inches (71.7 cm) and tread widths ranging from approximately 4 inches (10.2 cm) to 6.25 inches (15.9 cm) the shafts 58 and 62 were spaced apart 5 inches and the shafts 80,82 and corresponding shafts of the trimmers 42A,42B were spaced apart 3.25 inches (8.25 cm) for rollers of 1 inch (2.54 cm) in diameter and 3 inches (7.62 cm) in length. The cutting edge of the knife of each vent trimmer has a dimension parallel to the rollers equal to the length of the rollers, and the knife of each vent trimmer was aligned with the rollers of the respective vent trimmer. The next adjacent ends of the rollers of the trimmers 42A and 42B were spaced apart a distance of 1.875 inches (4.8 cm) and more particularly each of the next adjacent ends of the rollers of the trimmers 42A,42B were spaced about 0.938 inches (2.4 cm) from and on opposite sides of a plane extending at right angles to the shafts 58,62 and passing through the midpoint of the rollers 84,86 of the trimmer 42. The rollers of the trimmers 42A,42B were inclined to the axis of the shaft 62 at an angle of 13 degrees.

In the operation of the apparatus as thus far described and shown a tire will be released by the stop or gate 34 so as to be conveyed, or permitted to roll down, to a position in engagement with the rollers of the various vent trimmers. At this time the terminal end portion 14 of the conveyor will be in its solid line position shown in FIG. 1 wherein the rollers of the vent trimmers engage and support the tire. Also at this time the rollers 86A,86B of the trimmers 42A,42B are spaced from the drive roller a distance substantially less then the diameter of the tire whereby the rollers of the vent trimmers in conjunction with the drive roller 20 will support the tire. Rotation of the drive roller 20 in the direction of the arrow 120 shown in FIG. 1 will cause rotation of the tire in the direction of the arrow 121 shown in FIGS. 1 and 4. The hold down roller 22 assures firm contact of the tire with the drive roller 20 and trimmer assemblies. As a tire is rotated the vents projecting from the ground engageable tread surface of the tire will be trimmed by the cutting edge portions of the knives of the vent trimmers. After a predetermined number of rotations of the tire, or a predetermined time, or other predetermined event, the rotation of the drive roller 20 is halted, and the end portion 14 of the conveyor is moved, or permitted to move, toward its dotted line position shown in FIG. 1 wherein the vent trimmers are spaced from the drive roller a distance substantially greater than the diameter of the tire. This permits the tire to fall on to the conveyor 30 for transport to its destination. The terminal portion 14 of the conveyor is then returned to its full line position shown in FIG. 1 whereby another tire is permitted to roll or be conveyed to the trimming position shown in FIG. 1. As clearly shown in FIG. 4A the outer end of the cutting portions of the knives should be spaced from the plane 92 tangent to the tire engageable surface of the rollers so that for any given tire diameter there will be no gouging of the tire. In the specific embodiment described above this minimum distance was approximately 0.050 of an inch (1.3 mm).

Figure 5:
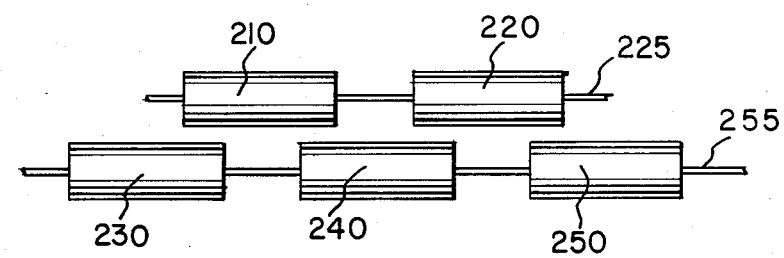
FIG. 5 is a diagrammatic representation of an alternative embodiment of the present invention.

While the invention has been described in connection with a specific embodiment it will be realized that changes and alterations could be made without departing from the spirit or scope of the invention. For example, as shown diagrammatically in FIG. 5 the vent trimmer apparatus could comprise more than three trimmers. For example as shown in FIG. 5 there might be provided two trimmers 210 and 220 mounted on a common shaft 225 and three trimmers 230, 240 and 250 mounted on a common shaft 255. In this case the end trimmers 230 and 250 would have their rollers inclined in the same manner as the trimmers 42A and 42B described above. In the case of the embodiment previously described the trimmers 42A and 42B being the sole trimmers on the shaft 62 also form the end trimmers of the assembly. Additionally in the alternative embodiment shown in FIG. 5 the spacing of the rollers of the trimmers 230, 240 and 250 and the spacing of the rollers of the trimmers 210 and 220 would be preselected to provide the same relationship to the range of the tread widths desired to be handled by the apparatus as described above in connection with the embodiment of FIGS. 1 through 4 although of course the specific dimensions might be different.

Figure 6:
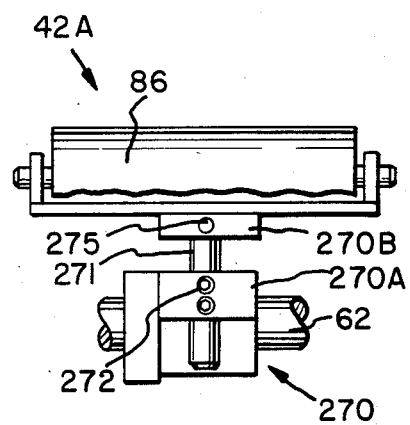
FIG. 6 is a fragmentary end view of a further alternative embodiment of the invention.
Figure 7:
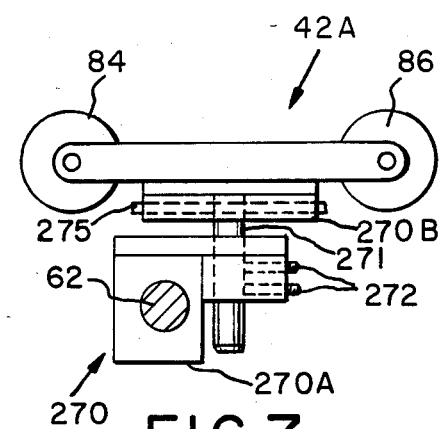
FIG. 7 is a fragmentary, side elevational view, partly in section, of the embodiment of FIG. 6.

An additional alternative embodiment is shown in FIGS. 6 and 7 and in connection with the specific embodiment described and shown in FIGS. 1 through 4 and more particularly in connection with the vent trimmer 42A. In this embodiment, the body 270 of the vent trimmer 42A has been provided in two parts 270A and 270B. The body portion 270A is mounted for limited rocking movement on the shaft 62 in the same manner as the body 70 of FIG. 4. The body portion 270B is provided with means for adjusting the spacing thereof from the axis of the shaft 62 and carry the rollers 84,86 for limited rocking movement about an axis extending perpendicularly to the axis of the shaft 62. More specifically, the body 270B includes a part 271 extending at right angles to but spaced from the shaft 62. The part 271 is slidably received in an opening in the body portion 270A and is releasably held in a predetermined position longitudinally of the longitudinal axis of the part 271 by set screws 272 in the body 270A. The body 270B is carried on the part 271 by a shaft 275 for limited rocking movement about the axis of the shaft 275 which extends at right angles to the shaft 62 and the axes of the rollers of the respective trimmers.

The means for limiting the rocking of the body 70B about is pivotal axis may be the same as shown in connection with the body 70 and the shaft 62 although the range of rocking movement may be different if desired. The embodiment of FIGS. 6 and 7 could accommodate a wider range of tire tread widths then the embodiment of FIGS. 1 through 4 and could of course be incorporated into the embodiment of FIG. 5 as well with respect to the end trimmers 230 and 250. If desired the feature shown in FIGS. 6 and 7 could also be utilized in conjunction with the remaining trimmers of the embodiment shown in FIG. 5.

Having thus described our invention, we claim:

1. Apparatus for trimming vents from the tread area of a tire comprising, means for rotatively supporting a tire including at least one vent trimmer, each said trimmer being operative to trim vents from and support a tire; each vent trimmer comprising a frame, a pair of tire engageable tire supportable rollers rotatably mounted on said frame in spaced parallel relation, a vent trimming knife, means mounting said knife on said frame generally between said rollers, said knife having a cutting edge portion extending parallel to the rotational axes of said rollers and lying between the common plane containing said rotational axes and a second plane extending parallel to said common plane and tangent to the tire engageable surfaces of said rollers; said vent trimmer, or trimmers, being disposed such that if the tire engageable surfaces of said rollers are all moved away from the remainder of said means for rotatably supporting a tire a distance greater than the diameter of a tire to be processed on said apparatus the remainder of said means for support cannot support said tire.

2. Apparatus as claimed in claim 1 further comprising, means mounting said frame of each said vent trimmer for limited rocking movement about a third axis which is disposed generally between the rotational axes of the rollers of the third, said trimmer axis being spaced from said knife in the direction extending from said knife toward said common plane containing said rotational axes.

3. Apparatus as claimed in claim 2 comprising, a plurality of sets of vent trimmers, each set including at least one vent trimmer, means mounting said sets in spaced apart relation, the third axis of each trimmer in each set thereof extending parallel to the third axis of each other trimmer in each set thereof.

4. Apparatus as claimed in claim 3 wherein the means mounting each said knife of each said trimmer includes means for securing the knife in a plurality of positions between a first limit position wherein the outer end of the knife is located closely adjacent but spaced a predetermined distance from said second plane and closely adjacent the tire engageable surface of one of the rollers of said trimmer and a second limit position spaced from said first limit position in a direction toward the other roller of the trimmer and spaced from said second plane a distance greater than said predetermined distance.

5. Apparatus as claimed in either of claim 3 or 4 in which at least one set of trimmers includes two trimmers spaced apart generally along the direction of said third axes of the trimmers in said one set and forming the end trimmers of the set, the axis of each of the rollers of each of the end trimmers being inclined from the outer end thereof toward the other end trimmer and generally toward the third axis of the associated end trimmer.

6. Apparatus as claimed in either of claim 3 or 4 in which at least one set of trimmers includes two trimmers spaced apart generally along the direction of said third axes of the trimmers in said one set and forming the end trimmers of the set, the axis of each of the rollers of each of the end trimmers being inclined from the outer end thereof toward the other end trimmer and generally toward the third axis of the associated end trimmer, the end trimmers of the set and means mounting the rollers of each of said end trimmers of said one set for limited rocking movement about an axis extending at right angles to the rotational axes of the rollers of the respective set.

7. Apparatus as claimed in claim 6 further comprising means mounting the last mentioned means for adjustment in a direction extending at right angles to said third axis.

8. Apparatus as claimed in either of claims 3 or 4 in which the number of sets of trimmers is two and in which the number of trimmers in one set thereof is two, said third axis of each trimmer in said one set being coincident with said third axis of the other trimmer in said one set to provide a common axis, the two trimmers of said one set being spaced apart along said common axis of said one set, the other set consisting of one trimmer, said common axis of said one set extending parallel to and being spaced from the third axis of said other set, the axes of the rollers of each of the trimmers of said one set being inclined toward the other trimmer of said one set and the plane containing said common axis and the third axis of said one set, the next adjacent ends of the rollers and the cutting edge portions of the knives of said one set being spaced apart a distance substantially less than the length of the cutting edge portion of the knife of said other set, the length of the cutting edge portion of the knife of each trimmer being approximately equal to the length of the rollers of the trimmer.

9. Apparatus as claimed in either of claims 3 or 4 in which the number of sets of trimmers is two and in which the number of trimmers in one set thereof is two, said third axis of each trimmer in said one set being coincident with said third axis of the other trimmer in said one set to provide a common axis, the two trimmers of said one set being spaced apart along said common axis of said one set, the other set consisting of one trimmer, said common axis of said one set extending parallel to and being spaced from the third axis of said other set a predetermined distance directly related to the range of diameters of tires to be trimmed by the apparatus, the axes of the rollers of each of the trimmers of said one set being inclined toward the other trimmer of said one set and the plane containing said common axis and the third axis of said one set, the next adjacent ends of the rollers and the cutting edge portions of the knives of said one set being spaced apart a second predetermined distance, said second predetermined distance and the angular amount of inclination of the rollers of each end trimmer being directly related to the range of widths of the treads of tires to be trimmed by the apparatus.

10. Apparatus as claimed in claim 2 further comprising, a conveyor extending at right angles to the axes of said rollers, said conveyor being operative to convey tires along a predetermined path and in a predetermined direction with the tires in a vertical position and with the axes of rotation of the tires extending at right angles to said path, said conveyor including a terminal end portion having a general plane, said trimmer being mounted on said terminal end portion with the third axis of said trimmer extending parallel to said general plane and transversely of said terminal end portion, said apparatus further including means providing a surface drive engageable with the tread of a tire, said surface drive being spaced from the distal end of said terminal end portion in said predetermined direction, said surface drive and the rollers of said trimmer providing the sole means for rotatably supporting a tire in a vertical position and for rotating the same about its normal rotational axis while trimming vents from at least a portion of the tread of the tire.

11. Apparatus as claimed in claim 10 further comprising, means mounting said terminal end portion of said conveyor for pivotal movement about an axis extending parallel to said third axis of said trimmer, means for moving said terminal end portion about its pivotal axis and into a predetermined position wherein said trimmer is spaced from said surface drive a distance less than the diameter of a tire to be processed by the apparatus, means for effecting movement of said terminal end portion about its pivotal axis and into a second predetermined position wherein said trimmer is spaced from said surface drive a distance greater than the diameter of a tire to be processed by the apparatus to permit a tire to pass between said trimmer and said surface drive.

12. Apparatus as claimed in claim 3 in which the number of sets of trimmers is two and in which the number of trimmers in one set thereof is two, said third axis of each trimmer in said one set being coincident with said third axis of the other trimmer in said one set to provide a common axis, the two trimmers of said one set being spaced apart along said common axis of said one set, the other set consisting of one trimmer, said common axis of said one set extending parallel to and being spaced from the third axis of said other set a predetermined distance directly related to the range of diameters of tires to be trimmed by the apparatus, means providing inclination of the axes of the rollers of each trimmer of said one set toward the other trimmer of said one set and the plane containing said common axis and the third axis of said one set being spaced apart a second predetermined distance, said second predetermined distance and the angular amount of inclination of the rollers of each trimmer of said one set being directly related to the range of widths of the treads of tires to be trimmed by the apparatus, said apparatus further comprising a conveyor extending generally transversely of said common axis and including a terminal end portion mounted for pivotal movement about an axis extending parallel to said common axis, means mounting each of said trimmers on said terminal end portion for movement therewith between a first predetermined position and a second predetermined position, a rotatable drive roller having an axis of rotation extending parallel to said common axis, said drive roller having a tire engageable surface which is contoured to receive the tread and shoulder portions of a vertically positioned tire in driving and lateral supporting relation, said drive roller and the trimmer most remote from said drive roller being spaced apart a distance substantially less than the diameter of a tire to be processed by the apparatus when said terminal end portion is in said first predetermined position thereof and a distance substantially greater than the diameter of a tire to be processed by said apparatus when said terminal end portion is in said second predetermined position thereof.

* * * * *